United States Patent
He et al.

(10) Patent No.: US 7,450,270 B2
(45) Date of Patent: Nov. 11, 2008

(54) IMAGE DATA PROCESSING METHODS, HARD IMAGING DEVICES, AND ARTICLES OF MANUFACTURE

(75) Inventors: Zhen He, West Lafayette, IN (US); Ti-Chiun Chang, West Lafaytte, IN (US); Charles Bouman, West Lafayette, IN (US); Jan Allebach, West Lafayette, IN (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1088 days.

(21) Appl. No.: 10/758,840

(22) Filed: Jan. 16, 2004

(65) Prior Publication Data

US 2005/0157348 A1 Jul. 21, 2005

(51) Int. Cl.
   *H04N 1/405* (2006.01)
(52) U.S. Cl. .................. 358/3.2; 382/237; 358/3.14
(58) Field of Classification Search ......... 358/3.2–3.22, 358/3.14–3.15, 3.06, 1.9, 2.1; 382/237
   See application file for complete search history.

(56) References Cited

U.S. PATENT DOCUMENTS

| | | | |
|---|---|---|---|
| 5,012,257 A | 4/1991 | Lowe et al. |
| 5,111,302 A | 5/1992 | Chan et al. |
| 5,271,070 A | 12/1993 | Truong et al. |
| 5,377,024 A | 12/1994 | Dillinger |
| 5,402,245 A | 3/1995 | Motta et al. |
| 5,473,446 A | 12/1995 | Perumal, Jr. et al. |
| 5,519,791 A | 5/1996 | Webb et al. |
| 5,537,228 A | 7/1996 | Dillinger |
| 5,553,165 A | 9/1996 | Webb et al. |
| 5,604,605 A | 2/1997 | Moolenaar |
| 5,657,137 A | 8/1997 | Perumal, Jr. et al. |
| 5,710,827 A | 1/1998 | Perumal, Jr. et al. |
| 5,809,217 A | 9/1998 | Bunce |
| 5,812,744 A | 9/1998 | Allebach et al. |

(Continued)

FOREIGN PATENT DOCUMENTS

EP      0295105      1/1995

(Continued)

OTHER PUBLICATIONS

"Memory Efficient Error Diffusion," Chang et al., IEEE Transactions of Image Processing, vol. 12, Issue 11, Nov. 2003, pp. 1352-1366.

(Continued)

*Primary Examiner*—Thomas D Lee
*Assistant Examiner*—Stephen M Brinich (57) ABSTRACT

Image data processing methods, hard imaging devices, and articles of manufacture are described. According to one embodiment, an image data processing method includes accessing image data of an image and comprising a plurality of pixels, defining a plurality of subsets of the pixels, defining an overlapping region comprising image data of pixels located adjacent to a boundary intermediate one and an other of the subsets, independently processing the image data of the one and the other of the subsets individually comprising comparing the image data for respective ones of the pixels with a plurality of thresholds corresponding to respective ones of the pixels, and modulating the thresholds of the pixels of the overlapping region using a common modulation pattern for both the processing of the one and the other subsets.

39 Claims, 5 Drawing Sheets

U.S. PATENT DOCUMENTS

| | | | |
|---|---|---|---|
| 5,892,851 | A | 4/1999 | Nguyen |
| 5,898,505 | A | 4/1999 | Lin et al. |
| 5,930,010 | A | 7/1999 | Cheung et al. |
| 5,949,964 | A | 9/1999 | Clouthier et al. |
| 5,949,965 | A | 9/1999 | Gondek |
| 5,973,803 | A | 10/1999 | Cheung et al. |
| 5,974,228 | A | 10/1999 | Heitsch |
| 5,982,990 | A | 11/1999 | Gondek |
| 5,991,512 | A | 11/1999 | Shaked et al. |
| 6,057,933 | A | 5/2000 | Hudson et al. |
| 6,081,344 | A | 6/2000 | Bockman et al. |
| 6,108,452 | A | 8/2000 | Ilbery |
| 6,307,978 | B1 | 10/2001 | Metaxas |
| 6,464,332 | B1 * | 10/2002 | Silverbrook et al. .......... 347/42 |
| 6,476,934 | B1 | 11/2002 | Ilbery et al. |
| 6,547,370 | B2 | 4/2003 | Mantell et al. |
| 6,775,027 | B1 | 8/2004 | Yamamura |
| 6,870,642 | B2 | 3/2005 | Ostromoukhov |
| 7,355,747 | B2 | 4/2008 | Pritchard |
| 2002/0122210 | A1 | 9/2002 | Ilbery |
| 2003/0137698 | A1 | 7/2003 | Pritchard |

FOREIGN PATENT DOCUMENTS

| | | |
|---|---|---|
| EP | 0808055 | 11/1997 |
| EP | 0810770 | 12/1997 |
| EP | 0626672 | 12/1998 |
| WO | WO03/093017 | 11/2003 |

OTHER PUBLICATIONS

"A survey of electronic techniques for pictorial reproduction," J. C. Stoffel and J. F. Moreland, IEEE Trans. on Communications, vol. 29, pp. 1898-1925, 1981.

"Tone dependent error diffusion," P. Li and J.P. Allebach, IEEE Trans. On Image Processing, vol. 13, No. 1, Jan. 2004, 15 pps.

"Tone dependent error diffusion," P. Li and J.P. Allebach, Proceedings of SPIE, vol. 4663, Dec. 2001, pp. 310-321.

"AM/FM Halftoning: A Method For Digital Halftoning Through Simultaneous Modulation of Dot Size Placement," Z. He and C.A. Bouman, Proc. Of SPIE Conf. on Color Imaging: Device Independent Color, Color Hardcopy, and Applications vol. 4663, 2002, pp. 322-334.

"FM Screen Design Using DBS Algorithm," J.P. Allebach and Q. Lin, Proc. Of IEEE Int's Conf. on Image Proc., vol. II, Sep. 1996, Lausanne, Switzerland, pp. 549-552.

"An adaptive algorithm for spatial greyscale," R. W. Floyd and L. Steinberg, Journal of the Society for Information Display, vol. 17, No. 2, pp. 75-77, 1976.

"Dithering with blue noise," R. A. Ulichney, Proc. of the IEEE, vol. 76, pp. 56-79, Jan. 1988.

"Optimized error diffusion for image display," B. Kolpatzik and C. A. Bouman, Journal of Electronic Imaging, vol. 1, No. 3, pp. 277-292, Jul. 1992.

"Analysis of halftone dot profile and aliasing in the discrete binary representation of images," J. P. Allebach and b. Liu, J. Optical Society. America. vol. 67, No. 9, pp. 1147-1154, Sep. 1977.

European Search Report dated Jan. 13, 2006.

English translation of Japanese Examiner's comments; Feb. 17, 2006; 2 pp.

Hewlett-Packard Company patent application, U.S. Appl. No. 08/812,777, filed Mar. 6, 1997; "Fast Error Diffusion Algorithm."; 19 pp.

* cited by examiner

IMAGE DATA PROCESSING METHODS, HARD IMAGING DEVICES, AND ARTICLES OF MANUFACTURE

BACKGROUND OF THE DISCLOSURE

Computer systems including personal computers, workstations, hand-held devices, etc. have been utilized in an increasing number of applications at home, the workplace, educational environments, entertainment environments, etc. Peripheral devices of increased capabilities and performance have been developed and continually improved upon to extend the functionality and applications of computer systems. For example, imaging devices, such as printers, have experienced significant advancements including refined imaging, faster processing, and color reproduction.

Error diffusion is a halftoning algorithm which may be used, for example, in digital printing. The error diffusion halftoning algorithm renders different tone levels by adaptively modulating local dot density. The algorithm may implement random dot placement substantially free of Moire artifacts when rendering images having strong periodic components while also achieving relatively high spatial resolution. Accordingly, the error diffusion algorithm may be used to render scanned images which may often have relatively strong embedded periodic screen frequencies.

Error diffusion processing utilizes a relatively significant computational load during processing operations. For example, error diffusion processing may compute and diffuse filtered pixel errors to neighboring pixels in addition to thresholding operations often implemented in screening algorithms. The significant computational load may be a drawback for use in high speed imaging applications.

At least some aspects of the disclosure provide improved apparatus and methods for processing image data.

DETAILED DESCRIPTION

At least some embodiments described herein are directed towards improving processing speeds of image data. In accordance with one exemplary implementation, some embodiments described herein are arranged in hard imaging device configurations. Other implementations wherein processing of image data is desired are possible. One embodiment of the disclosure provides a plurality of processing circuits configured to process respective subsets or portions of image data of an image in parallel. According to one arrangement, the processing circuits operate to implement halftone processing using error diffusion. Exemplary aspects of image processing including halftone processing using error diffusion are described in an article entitled "Memory Efficient Error Diffusion," Chang et al., IEEE Transactions of Image Processing, Vol. 12, Issue 11, November 2003, and a U.S. patent application having Ser. No. 10/054,652, entitled "A System For Improving the Speed of Data Processing,", filed Jan. 18, 2002, publication No. 2003/0137698, and assigned to the assignee hereof. Other aspects are described below.

Figure 1:
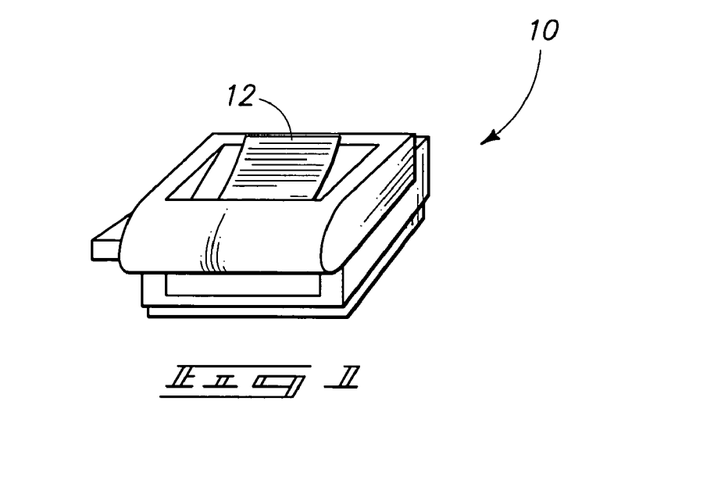
FIG. 1 is an isometric view of an exemplary image forming device.

Referring to FIG. 1, an exemplary hard imaging device 10 is shown. Hard imaging device 10 is configured to generate color hard images upon output media 12, such as sheets of paper, transparencies, envelopes, etc. Hard imaging device 10 may comprise a printer, copier, multiple function peripheral or printer (MFP), facsimile machine, or any other device configured to generate hard images including color images. Device 10 may be configured as a color inkjet printer or electrophotographic printer in exemplary embodiments. At least some aspects of the disclosure may be used in high speed embodiments to increase imaging speeds of the device 10. Other embodiments of hard imaging device 10 are possible.

Figure 2:
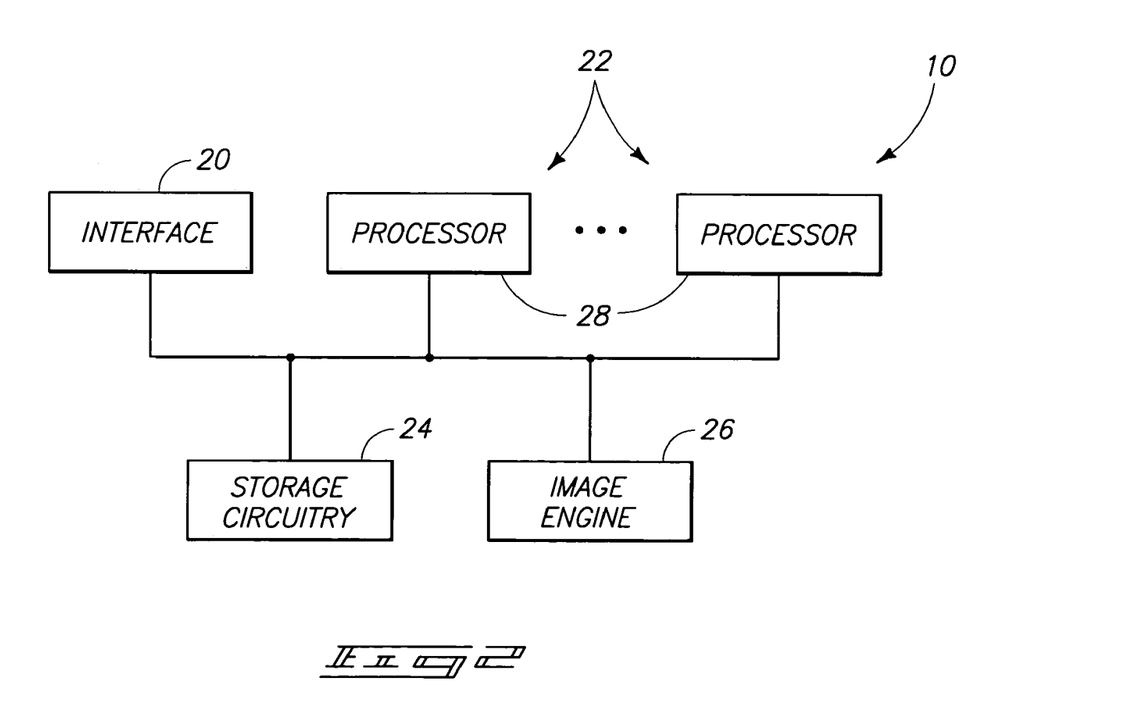
FIG. 2 is a functional block diagram illustrating components of an exemplary hard imaging device.

Referring to FIG. 2, hard imaging device 10 may include a communications interface 20, processing circuitry 22, storage circuitry 24, and an image engine 26 in one embodiment. In one embodiment, processing circuitry 22 comprises a plurality of processors 28 configured to implement image data processing operations. For example, in one embodiment, processors 28 comprise digital signal processors (DSPs) individually arranged to perform error diffusion halftone processing. Processors 28 may independently process respective subsets of image data for an image in one embodiment. Additional details regarding exemplary operations of processors 28 are described below. Other configurations of device 10 are possible including more, less and/or alternative components or component arrangements.

Communications interface 20 is configured to provide connectivity of hard imaging device 10 with respect to external devices (not shown), such as host computing systems, servers, etc. Communications interface 20 may be embodied as a parallel port, network interface card (NIC), or any other configuration to implement external communications of device 10.

Processing circuitry 22 may comprise circuitry configured to implement desired programming in one embodiment. According to the example mentioned above, processors 28 of processing circuitry 22 may be implemented as digital signal processors (DSP). Other arrangements of processing circuitry 22 and/or processors 28 are possible including structures configured to execute executable instructions including, for example, software and/or firmware instructions. Other exemplary embodiments of processing circuitry 22 and/or processors 28 may include or comprise microprocessors (available from Intel Corporation or Advanced Micro Devices) hardware logic, PGA, FPGA, ASIC, and/or other structures. These examples of processing circuitry 22 and/or processors 28 are for illustration and other configurations are possible.

Storage circuitry 24 is configured to store electronic data (e.g., image data), programming such as executable instructions (e.g., software and/or firmware usable to configure processing circuitry 22 to implement image processing operations), or other digital information and may include processor-usable media. Processor-usable media includes any article of manufacture which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

Image engine 26 is configured to generate images responsive to processed image data. In the exemplary hard imaging device arrangement, image engine 26 comprises a print engine configured to render color images upon output media 12. Other embodiments are possible.

Figure 3:
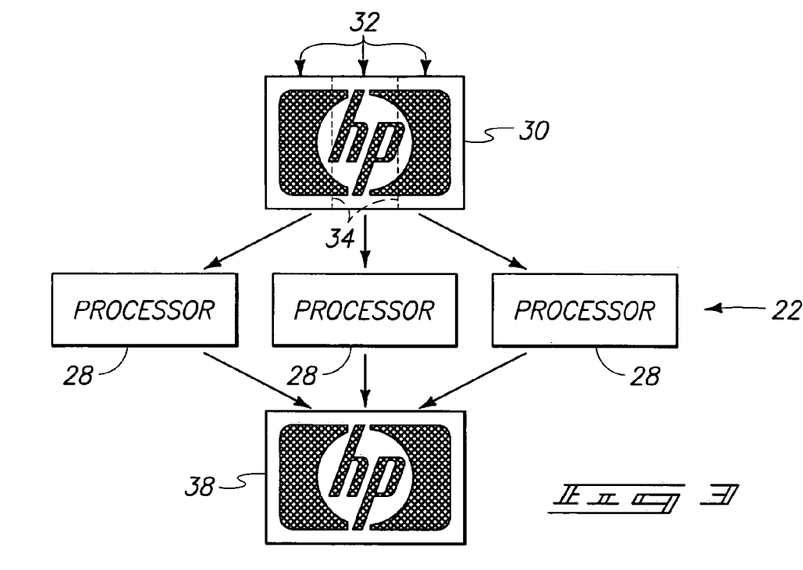
FIG. 3 is an illustrative representation of exemplary image processing.

Referring to FIG. 3, exemplary processing of image data of an input image 30 to be processed is shown. Image 30 may comprise a digital photograph in one embodiment, and digital image data for the photograph may be stored in appropriate memory or other storage circuitry external or internal of device 10. Other images 30 comprising digital data are possible.

It may be desired to process image data of image 30 during hard imaging or other operations. In one embodiment, hard imaging device 10 implements halftone processing of the image data. For example, hard imaging device 10 may provide error diffusion halftone processing in one arrangement. One embodiment of hard imaging device 10 includes processing circuitry 22 comprising a plurality of processors 28 as described above. Utilization of plural processors 28 may improve the processing speed of the image data enabling hard imaging device 10 to form hard images in less time.

According to one exemplary processing method, processors 28 are configured to access different respective subsets of the image data corresponding to regions or subsets 32 of image 30 to be processed. Subsets 32 are defined to comprise stripes of equal area in the depicted example, however, other configurations of subsets 32 may be defined or utilized. One or more boundaries 34 may separate or divide adjacent ones of subsets 32.

Processors 28 access different respective subsets of the image data corresponding to the subsets 32 of the image. The image data may comprise gray-scale data (e.g., 8 bit values) for a plurality of pixels of subsets 32 in one embodiment. Processors 28 may be programmed to process (e.g., halftone process) the image data of respective subsets 32 in parallel. Processors 28 may implement error diffusion halftone processing of the respective image data in the described exemplary implementation. As described in further detail below with respect to FIG. 4, individual processors 28 may also process at least some image data of another subset 32 during the processing of image data 32 of a respective desired subset in at least one embodiment.

Processed (e.g., halftoned) and outputted image data of the respective subsets 32 may be outputted for formation of a halftoned output image 38 comprising a composite image of the respective processed subsets 32. In one embodiment, the outputted image data may be applied to image engine 26 for the formation of image 38 comprising a hard image upon media 12. The outputted image data may be spliced or merged to create the output image 38 in the illustrated exemplary embodiment.

To reduce artifacts in the output image 38, at least some embodiments provide modified processing of the image data. For example, in at least one embodiment, processors 28 operate independently to process image data of the respective subsets 32 without knowledge of processing of image data of other subsets 32 by other processors 28. Exemplary independent processing includes processing without synchronization or communication between processors 28. The independent processing of image data may be beneficial in at least one embodiment inasmuch as the processing of the image data and implementations of processors 28 may be simplified. However, artifacts may be introduced by independent processing of image data of subsets 32 by respective processors 28 for the generation of output image 38. Exemplary processing by processors 28 is described below to reduce or minimize artifacts or errors resulting from independent processing of the image data by processors 28 according to one embodiment.

Figure 4:
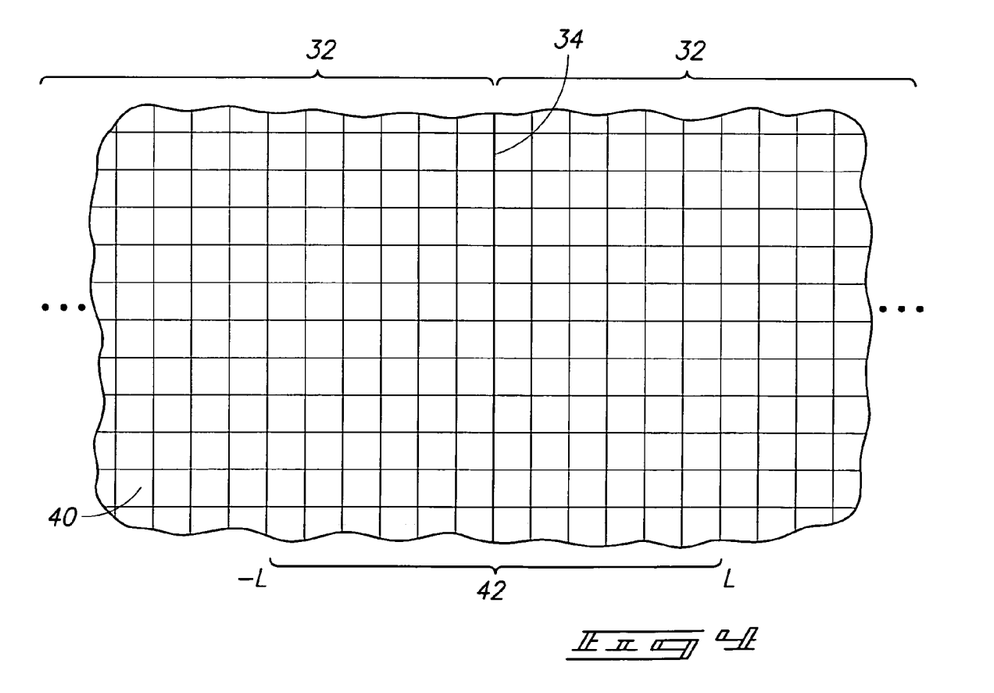
FIG. 4 is an illustrative representation of an overlapping region of image data according to one embodiment.

Referring to FIG. 4, exemplary processing of image data by processors 28 is described. Image data for a plurality of pixels 40 is shown adjacent boundary 34 separating subsets 32 of the exemplary embodiment. An overlapping region 42 is also shown about boundary 34 in the depicted embodiment. In the depicted example, the overlapping region 42 is shown extending six pixels to the left and the right of boundary 34. Other configurations of overlapping region 42 are possible.

As mentioned above in one embodiment, during image data processing, individual processors 28 process image data of a respective subset 32 as well as at least some image data of another subset 32. In the depicted example, the overlapping region 42 corresponds to or includes the additionally processed image data of a subset adjacent to the image data of the respective subset being processed.

For example, if one processor 28 is responsible for processing the subset of image data of the left subset 32 of image 30, the same processor 28 also processes image data of the middle subset 32 of image 30 residing within the overlapping region 42. In similar fashion, if the middle processor 28 is responsible for processing a subset of the image data corresponding to the middle subset 32, the middle processor 28 also processes image data of the left subset 32 residing within the overlapping region 42 according to one embodiment. The left and right borders of overlapping region 42 may defined as "−L" and "L," respectively, corresponding to a distance of the borders from boundary 34.

Exemplary processing of image data by processors 28 comprises comparing individual pixel values of the image data with a respective threshold to determine whether the pixel is a binary 1 or a binary 0 for the processed (e.g., halftoned) image data in one embodiment.

The thresholds may be modulated prior to the comparison to reduce the presence of artifacts and/or for other reasons. According to one embodiment, thresholds corresponding to pixels 40 of the overlapping region 42 may be modulated to reduce the presence of artifacts resulting from independent processing of the image data by processors 28. Also, thresholds within or outside of the overlapping region 42 may be further modulated for other reasons. Accordingly, if the thresholds for pixels 40 outside of the overlapping region 42 are modulated, a plurality of threshold modulation schemes may be used in one embodiment (i.e., one modulation scheme for thresholds of pixels 40 within the overlapping region 42 (e.g., $T(i, j)+\Delta T(i, j)$ in the examples below) and another modulation scheme for thresholds of pixels 40 outside of the overlapping region 42 (e.g., $T(i, j)$ in the examples below). If thresholds outside of the overlapping region 42 are not modulated, a common threshold modulation scheme of the thresholds within the overlapping region 42 may be used (e.g., ΔT(i, j).

As described further below in accordance with one example, a common modulation pattern may be used to modulate the thresholds, of pixels 40 of the overlapping region 42 for the ΔT(i, j) modulation and the modulated thresholds may be used by a plurality of processors 28 to reduce artifacts resulting from the independent processing of the image data of the respective subsets 32 by respective processors 28. In one embodiment, the modulation provides, for individual pixels 40 of the overlapping region 42, the same common threshold used by the respective plural independent processors 28 for processing image data of the respective different subsets 32. In one embodiment, the resultant calculated modulated thresholds of pixels 40 within overlapping region 42 result from usage of the common modulation pattern by the respective independent processors 28 for the ΔT(i, j) modulation. An absolute indexing scheme may be used in one embodiment within the overlapping region 42 enabling plural respective processors 28 to achieve the common thresholds.

The common modulation pattern may be calculated by a predetermined halftone texture in one embodiment. An exemplary halftone texture is a binary pattern, such as a stitching matrix, examples of which are described below. Further, according to one embodiment, different levels of threshold modulation within the overlapping region 42 may be implemented. For example, pixels located closer to a boundary 34 may be threshold modulated to a greater degree than pixels relatively spaced farther from the boundary. Put another way, the threshold modulation may be attenuated to lesser degree (if at all) for pixels located adjacent to boundary 34 compared with pixels spaced increased distances with respect to boundary 34. An exemplary position dependent weighting (f(j)) is described further below. The weighting f(j) may be combined with the stitching matrix p(i, j) to provide a common modulation pattern for $\Delta T_k(i, j)$ also described below in one embodiment.

Following processing of the image data by the parallel processors 28, the processed image data is spliced to produce composite halftoned image 38. Some processed image data may be discarded during the composition of the subsets 32. In one example, for a given processed subset 32, the image data within the overlapping region 42 from the adjacent subset 32 may be discarded inasmuch as the processed data may be used from the adjacent subset 32 itself and corresponding to the discarded pixels.

Figure 5:
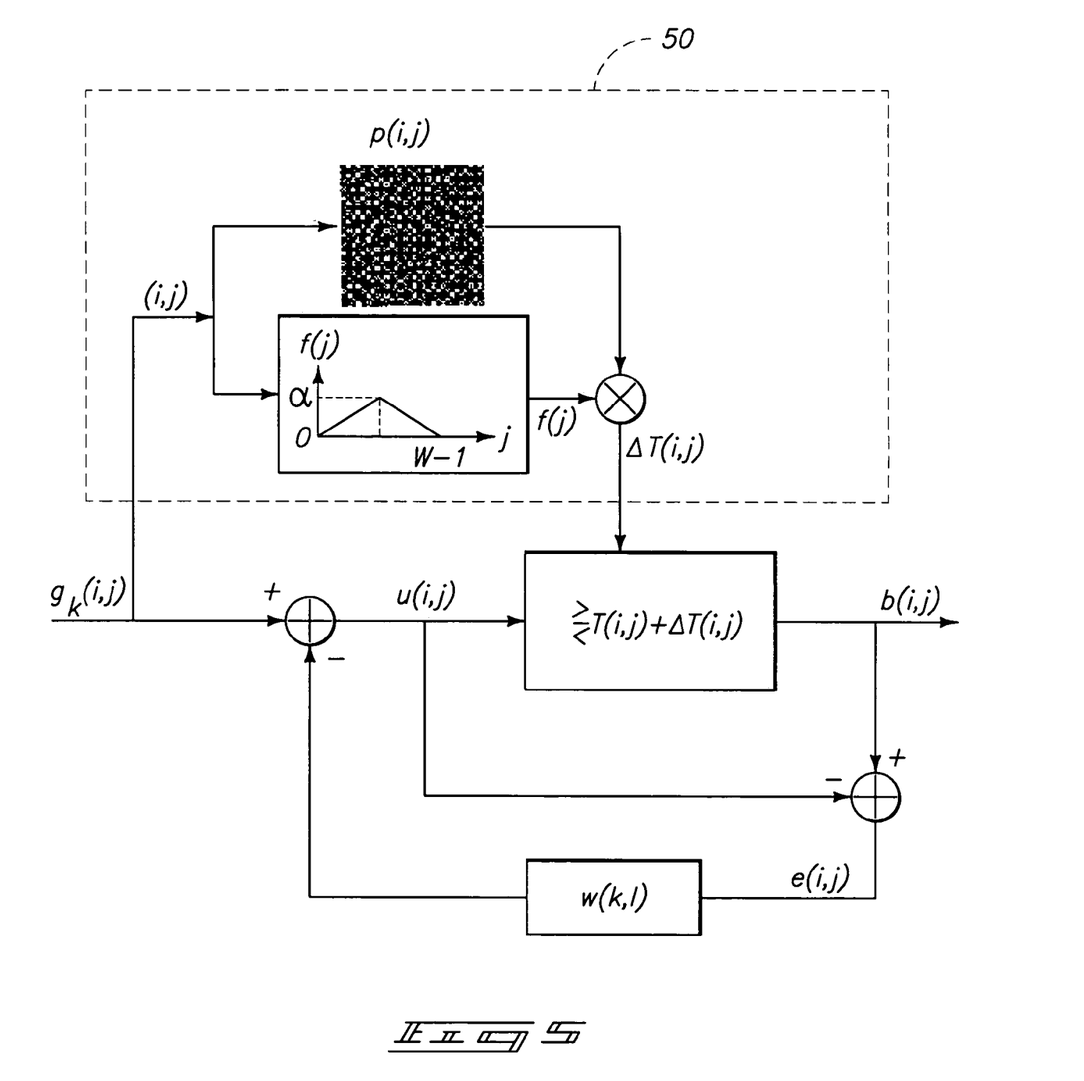
FIG. 5 is an illustrative representation of an exemplary boundary stitching implementation according to one embodiment.

Referring to FIG. 5, further details regarding exemplary image data processing by individual processors 28 to reduce artifacts is shown in accordance with one embodiment. Further, a plurality of exemplary formulae are presented for implementing exemplary image data processing described herein.

For example, in order to process image data with K independent processors 28, the image data may be separated into k subsets corresponding to subsets of the image and comprising vertical stripes in one embodiment as described above. The stripes may be equal in width in one embodiment. Other *subset geometries or configurations are possible.

The provided image data may comprise input gray scale image data which is denoted as g(i, j) where 0≦i<M and 0≦j<N for a M×N raster of data in one embodiment. In one example, N may be assumed to be an integer multiple of K so each stripe is of width N/K. In this embodiment, a given one of processors 28 may be referred to as k and which processes halftone output pixels for columns j in the range of k(N/K)≦j<(k+1)(N/K). The binary output for processor k may be denoted as $b_k(i, j)$. The output $b_k(i, j)$ of individual processors 28 may be spliced together to form a single binary image b(i, j) using eqn. 1 which also operates to discard some image data as described above.

$$b(i, j) = b_{\lfloor jK/N \rfloor}(i, j) \qquad \text{Eqn. 1}$$

where $\lfloor \bullet \rfloor$ denotes the floor function.

In accordance with one described embodiment, individual processors 28 process a subset of image data which is enlarged on both sides of the subset by W/2 pixels (i.e., for interior subsets) where W is an even number corresponding to a width of the overlapping region 42. Subsets of image data processed by adjacent processors 28 overlap along a region that is W pixels wide corresponding to the overlapping region 42. Accordingly, a $k^{th}$ processor 28 actually processes pixels with column index j in the range of k(N/K)−W/2≦j<(k+1)(N/K)+W/2.

Figure 6:
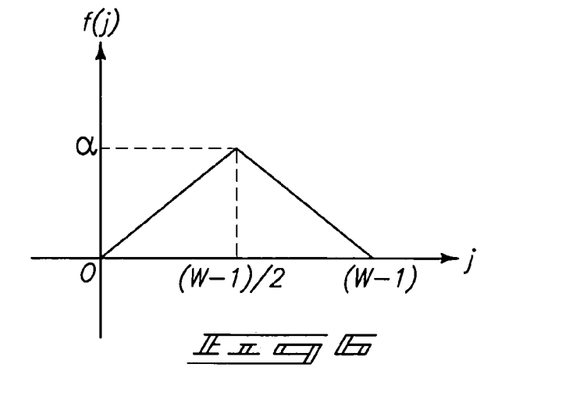
FIG. 6 is a graphical representation of a weighting function according to one embodiment.

FIG. 5 illustrates an exemplary scheme for enabling splicing operations of eqn. 1 with reduced artifacts along boundary 34 of the spliced subsets 32. Error diffusion may be applied to g(i, j) with an additional threshold modulation term $\Delta T_k(i, j)$ applied within overlapping regions 42 represented by reference 50. An error diffusion algorithm is applied for columns j in a range k(N/K)−W/2≦j<(k+1)(N/K)+W/2 using a mathematic recursion provided by eqns. 2-4

$$u(i, j) = g(i, j) + \sum_{l>0} w(0, l)e(i, j-l) + \qquad \text{Eqn. 2}$$
$$\sum_{l} w(1, l)e(i-1, j-l)$$

$$b(i, j) = \begin{cases} 1 & \text{if } u(i, j) \geq (T(i, j) + \Delta T_k(i, j)) \\ 0 & \text{otherwise} \end{cases} \qquad \text{Eqn. 3}$$

$$e(i, j) = u(i, j) - b(i, j) \qquad \text{Eqn. 4}$$

where w(k, l) are error diffusion weights that may normally sum to one, T(i, j) are desired error diffusion threshold weights, and $\Delta T_k(i, j)$ is an additional threshold component added along boundaries 34 so binary patterns generated by adjacent subsets match-up properly reducing artifacts. In a more specific example, for a $k^{th}$ processor 28

$$\Delta T_k(i, j) = p(i \bmod M, j \bmod M)[f(j-k(N/K)-W/2)+f(j-(k+1)(N/K)-W/2)] \qquad \text{Eqn. 5}$$

where p(i, j) is an M×M stitching matrix, and f(j) is a position dependent weighting. The function f(j) is selected so that it is zero for j<0 or j≧W, has a peak at j=(W/2)−1, and is smoothly varying in the region therebetween. The following function may be implemented:

$$f(j) = \alpha \Lambda \left( \frac{j - (W-1)/2}{W-1} \right) \qquad \text{Eqn. 6}$$

where $\Lambda(t) = \max\{0, 1-|t|\}$. FIG. 6 illustrates an exemplary form of the function.

Stitching matrix p(i, j) specifies a desired predetermined halftone texture pattern imposed by appropriate threshold modulation in the overlapping region 42 and may function similar to a threshold screen in order dot dithering in one embodiment. According to one exemplary stitching matrix, a dispersed-dot screen may be used to produce a halftone texture pattern similar to error diffusion. This exemplary screen matrix may be designed by mimicking the spectrum of the error diffusion pattern. Since boundary artifacts are usually most visible in a midtone area, a second choice for p(i, j) is to select a binary pattern in a midtone area produced by error diffusion itself in one example.

Figure 7A:
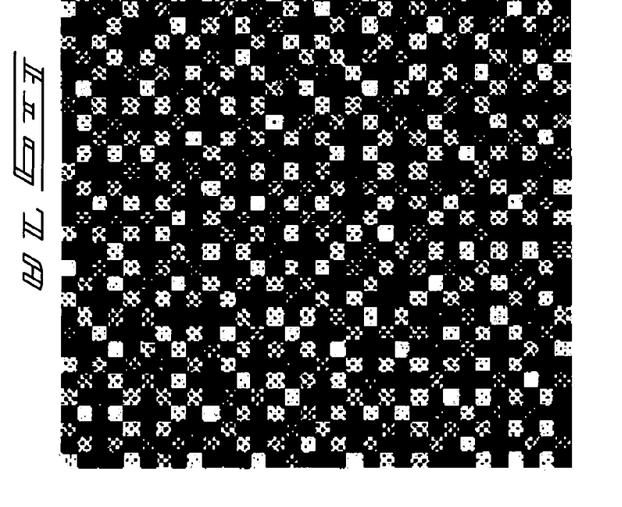
FIG. 7A is an illustrative representation of an exemplary modified DBS screen stitching matrix according to one embodiment.
Figure 7B:
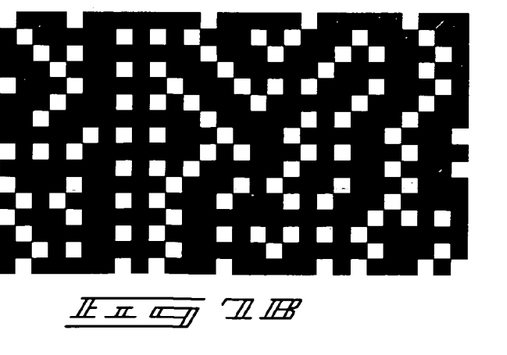
FIG. 7B is an illustrative representation of an exemplary binary midtone pattern stitching matrix according to one embodiment.

Referring to FIGS. 7A-7B, two examples of the stitching matrix are shown. FIG. 7A illustrates a modified DBS screen while FIG. 7B illustrates a binary midtone pattern from error diffusion.

In one example, exemplary boundary stitching aspects described herein were implemented with a fast low bit-rate AM/FM halftoning algorithm designed for an electrophotographic multifunction printer (MFP) application. The AM/FM halftoning algorithm is a class of hybrid halftoning algorithms which simultaneously modulate dot size and dot density for individual gray levels to achieve high quality digital printing.

Figure 8:
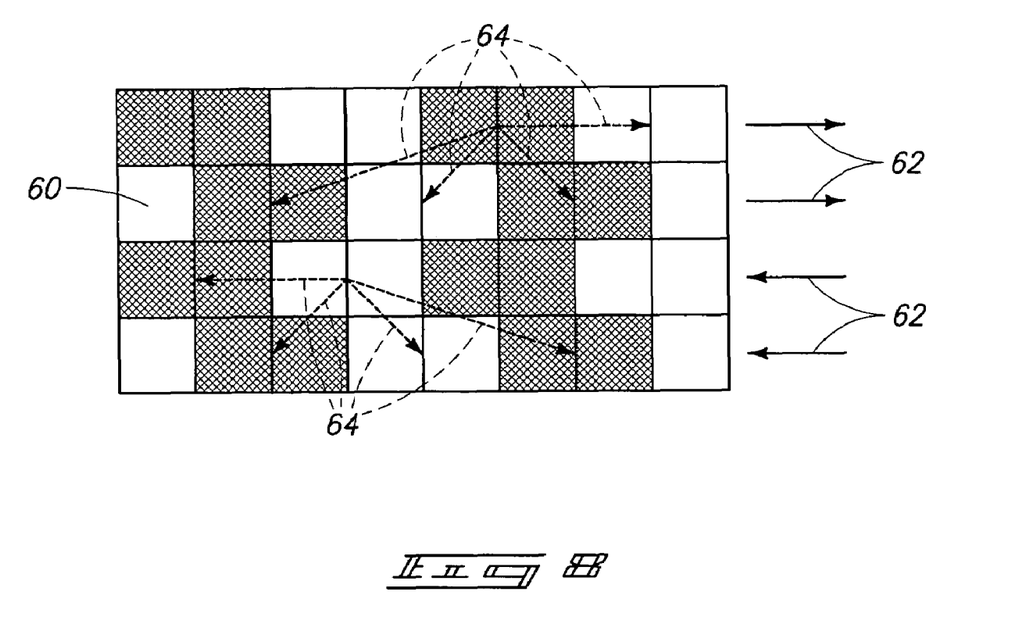
FIG. 8 is an illustrative representation of an exemplary application of error diffusion image processing according to one embodiment.

Referring to FIG. 8, some details of the FM component of the error diffusion AM/FM halftoning algorithm are described. Pixels 60 may be initially grouped into pairs. Arrows 62 illustrate scan direction and arrows 64 illustrate positions to diffuse error. There may be one pixel offset for alternative rows and dot firing is enforced along a diagonal grid in one example. Four filter weights are tone-dependent and trained with a method described in "Tone dependent error diffusion," P. Li and J. P. Allebach, *IEEE Trans. On Image Processing*, Vol. 13, No. 1, January 2004, and in "Tone dependent error diffusion," P. Li and J. P. Allebach, Proceedings of SPIE, Vol. 4663, pps. 310-321, December 2001, the teachings of which are incorporated herein by reference. Threshold value T(i, j) may be fixed to 127 and a two-row serpentine scan order may be used to process individual pixels 60. An exemplary hard imaging device used in the experiments was a LaserJet 9000 available from The Hewlett-Packard Company and having a 2-bit/pixel pulse width modulation capability. Additional details regarding exemplary AM/FM halftoning are described in "AM/FM Halftoning: A Method For Digital Halftoning Through Simultaneous Modulation of Dot Size Placement," Z. He and C. A. Bouman, *Proc. Of SPIE Conf. on Color Imaging: Device Independent Color, Color Hardcopy, and Applications*, vol. 4663, 2002, pp. 322-334.

In exemplary experiments, a width of the overlapping region 42 was selected as W=32. Three different specifications of the stitching matrix were compared. First, p(i, j)=0 was set everywhere (i.e., no threshold modulation was applied in overlapping region 42) and this was referred to as the "direct-cut" version.

In another experiment, p(i, j) was set to the modified version of the DBS screen shown in FIG. 7A and as described in "FM Screen Design Using DBS Algorithm," J. P. Allebach and Q. Lin, *Proc. Of IEEE Int's Conf. on Image Proc.*, vol. II, September 1996, Lausanne, Switzerland, pp. 549-552. The power spectrum of the tone-dependent error diffusion mimics that of the halftone pattern produced by the DBS algorithm. Therefore, the DBS screen should produce a halftone pattern similar to error diffusion. An original DBS screen size of 16×16 was selected. An element specification of the exemplary screen is provided in Table A.

TABLE A

| 83 | 121 | 190 | 64 | 145 | 16 | 175 | 106 | 50 | 135 | 21 | 208 | 58 | 168 | 101 | 204 |
|---|---|---|---|---|---|---|---|---|---|---|---|---|---|---|---|
| 219 | 22 | 243 | 37 | 202 | 222 | 77 | 235 | 197 | 91 | 245 | 157 | 119 | 5 | 250 | 49 |
| 46 | 168 | 103 | 134 | 87 | 116 | 32 | 151 | 9 | 180 | 43 | 81 | 224 | 190 | 71 | 133 |
| 236 | 149 | 55 | 183 | 3 | 251 | 167 | 59 | 124 | 230 | 141 | 108 | 27 | 147 | 93 | 183 |
| 93 | 12 | 206 | 229 | 158 | 70 | 210 | 99 | 217 | 67 | 17 | 174 | 237 | 40 | 216 | 13 |
| 188 | 125 | 74 | 109 | 43 | 129 | 20 | 187 | 35 | 113 | 195 | 77 | 202 | 126 | 62 | 161 |
| 34 | 246 | 142 | 26 | 173 | 238 | 94 | 144 | 162 | 249 | 49 | 152 | 3 | 102 | 242 | 115 |
| 161 | 65 | 180 | 218 | 83 | 198 | 53 | 224 | 7 | 88 | 131 | 213 | 170 | 52 | 193 | 23 |
| 194 | 101 | 5 | 58 | 154 | 13 | 120 | 78 | 205 | 179 | 29 | 71 | 233 | 138 | 84 | 222 |
| 48 | 226 | 135 | 249 | 113 | 191 | 242 | 137 | 46 | 104 | 245 | 118 | 36 | 97 | 9 | 149 |
| 87 | 118 | 207 | 31 | 96 | 39 | 166 | 22 | 230 | 156 | 15 | 189 | 165 | 208 | 250 | 66 |
| 156 | 16 | 171 | 75 | 233 | 148 | 69 | 176 | 60 | 91 | 216 | 142 | 58 | 25 | 128 | 180 |
| 236 | 185 | 63 | 130 | 201 | 3 | 221 | 108 | 203 | 124 | 42 | 80 | 226 | 197 | 104 | 39 |
| 42 | 105 | 216 | 27 | 85 | 181 | 50 | 132 | 10 | 239 | 185 | 112 | 4 | 88 | 158 | 234 |
| 138 | 7 | 152 | 251 | 121 | 101 | 244 | 145 | 74 | 162 | 30 | 151 | 247 | 174 | 18 | 119 |
| 225 | 80 | 189 | 56 | 165 | 19 | 193 | 36 | 227 | 97 | 211 | 65 | 135 | 48 | 205 | 76 |

In a final experiment, a 16×32 midtone binary pattern from a ramp produced by error diffusion was selected to be the stitching matrix p(i, j) and as shown in FIG. 7B. The element of the binary pattern is either 0 or 255 in the example. In practice, the DC component of the matrix p(i, j) was removed to avoid a potential sharpening effect at a boundary between the overlapping and non-overlapping zones. A value of alpha in the weighting function f(x) may be determined empirically by inspecting a visual quality of the actual printouts. From the experiments, it was found that an alpha of 0.2 produced the best visual quality for stitching with the modified DBS screen, and an alpha of 0.13 produces the best visual quality for stitching with a binary midtone pattern.

Using a four processor 28 arrangement, the results of the three experiments were printed on a target printer at 600 dpi, the resulting hard copy was scanned at 1200 dpi, and rendered at 300 dpi. Three vertical lines at the stripe boundaries were visible for the direct cut method wherein no threshold modulation was used for the stitching. The other two methods outperformed the direct-cut experiment with large dot clusters and holes effectively avoided. It was observed that stitching with the modified DBS screen achieved the best results. Further, stitching with the binary midtone pattern outperformed the "direct-cut" experiment although the ability to reduce boundary artifacts was dependent upon the selection of the binary midtone pattern.

At least some aspects of the disclosure present exemplary image processing techniques for parallel implementation of error diffusion processing. Further, with utilization of parallel independent processors greatly increases the speed of halftoning processing (e.g., by a factor of four if four processors are utilized). By creating overlapping regions across adjacent subsets and enforcing a binary pattern using threshold modulation within an overlapping zone according to one embodiment, boundary artifacts (e.g., dot clusters and holes across boundary areas) are effectively reduced. More specifically, pixel error can not be diffused across subset boundaries so "blue noise" characteristics of the halftone texture are destroyed near the subset boundaries. The resultant artifacts without the exemplary processing described herein may be most visible near midtone areas and somewhat less visible in shadow areas. In highlight areas the dots are sparse so artifacts are less visible.

Accordingly, at least some exemplary embodiments herein disclose methods and apparatus to reduce artifacts by modifying dot distribution of error diffusion near boundary areas using exemplary boundary stitching described herein. As described herein in exemplary embodiments, an overlapping region may be created for adjacent subsets of image data. A predetermined halftone texture may be imposed by appropriate threshold modulation in the overlapping region. For example, a stitching matrix may be multiplied by a position-dependent weighting function to form appropriate threshold modulation within the overlapping region. The threshold modulation is applied to error diffusion to stitch the halftone texture along a boundary area across adjacent subsets providing smooth halftone texture transition across the boundary in a merged composite halftoned image. Boundary artifacts of parallel implantation of error diffusion processing are reduced providing benefits, for example, in high speed printing with relatively minor increases in computational load.

The protection sought is not to be limited to the disclosed embodiments, which are given by way of example only, but instead is to be limited only by the scope of the appended claims.

What is claimed is:

1. An image data processing method comprising:
accessing image data of an image and comprising a plurality of pixels;
defining a plurality of subsets of the pixels;
defining an overlapping region comprising image data of pixels located adjacent to a boundary intermediate one and an other of the subsets;
independently processing the image data of the one and the other of the subsets individually comprising comparing the image data for respective ones of the pixels with a plurality of thresholds corresponding to respective ones of the pixels; and
modulating the thresholds of the pixels of the overlapping region using a common modulation pattern for both the processing of the one and the other subsets.

2. The method of claim 1 wherein the processing comprises for the one of the subsets using image data of the other of the subsets within the overlapping region, and for processing the other of the subsets using the image data of the one of the subsets within the overlapping region.

3. The method of claim 2 wherein the processing of the image data of the one of the subsets comprises discarding the image data of the other of the subsets and wherein the processing of the image data of the other of the subsets comprises discarding the image data of the one of the subsets.

4. The method of claim 1 further comprising splicing the processed image data of the one and the other subsets to form a composite image.

5. The method of claim 1 wherein the modulating provides, for individual ones of the pixels of the overlapping region, the same threshold for the processing of the image data of the one and the other of the subsets.

6. The method of claim 5 further comprising providing an absolute indexing scheme for pixels of the overlapping region.

7. The method of claim 1 wherein the modulating comprises modulating according to a first modulation scheme, and further comprising modulating the thresholds of the pixels of the one and the other subsets not within the overlapping region according to a second modulation scheme different than the first modulation scheme.

8. The method of claim 1 wherein the independently processing comprises halftoning the image data.

9. The method of claim 8 wherein the halftoning comprises halftoning using error diffusion.

10. The method of claim 1 further comprising attenuating the modulating to a lesser degree for pixels located adjacent to the boundary compared with pixels spaced increased distances with respect to the boundary.

11. The method of claim 1 further comprising hard imaging the image data upon media after the processing.

12. The method of claim 1 wherein the independently processing comprises processing the image data of the subsets using respective ones of a plurality of independent processing circuits.

13. The method of claim 1 wherein the independently processing the image data of the one and the other of the subsets comprises processing using respective ones of a plurality of processors, and wherein the processing of the image data of the one of the subsets comprises processing using one of the processors without knowledge of the processing of the image data of others of the subsets using any others of the processors.

14. An image data processing method comprising:
accessing image data of an image and comprising a plurality of pixels;
defining a plurality of subsets of the pixels;
independently processing image data of the subsets using error diffusion, wherein the error diffusion processing of the image data of the pixels of one of the subsets comprises processing using image data of the pixels of an other of the subsets; and
after the processing, splicing the image data of the subsets to provide a composite version of the processed image data of the image.

15. The method of claim 14 wherein the processing of the image data of the pixels of the one of the subsets using the image data of the pixels of the other of the subsets comprises using the image data of the pixels of the other of the subsets residing within an overlapping region adjacent to a boundary intermediate the plurality of the subsets.

16. The method of claim 15 wherein processing of the image data of the pixels within the overlapping region during the processing of the one and the other subsets comprises processing using a common threshold modulation scheme comprising comparing the image data of the pixels of the overlapping region with the same thresholds during the processing of the image data of the one and the other subsets.

17. The method of claim 16 further comprising attenuating threshold modulation of the common threshold modulation scheme to a lesser degree for pixels located adjacent to the boundary compared with pixels spaced increased distances with respect to the boundary.

18. The method of claim 15 wherein the processing comprises comparing the image data of the pixels with a plurality of respective thresholds, and further comprising modulating the thresholds for the pixels of the overlapping region using a common modulation pattern.

19. The method of claim 14 wherein the independently processing comprises processing using a plurality of respective processors.

20. The method of claim 19 wherein the independently processing comprises processing without using communications between the processors.

21. The method of claim 19 wherein the independently processing comprises processing without synchronization of the processors.

22. The method of claim 14 wherein the independently processing the image data of the subsets comprises processing using respective ones of a plurality of processors, and wherein the processing of the image data of one of the subsets comprises processing using one of the processors without knowledge of the processing of the image data of others of the subsets using any others of the processors.

23. A hard imaging device comprising:
an image engine configured to generate a hard image upon media using image data of an image; and
a plurality of processors configured to access different respective subsets of the image data used to generate the hard image, and wherein the processors are further configured to independently process the image data of respective ones of the subsets using error diffusion halftone processing, and wherein an individual one of the processors is configured to implement the error diffusion halftone processing of the image data of the respective one of the subsets using image data of an other of the subsets; and
wherein the processed image data of the respective subsets is spliced for the generation of the hard image using the image engine.

24. The device of claim 23 wherein the image data comprises data for a plurality of pixels and wherein the processors are individually configured to define an overlapping region comprising image data of selected ones of the pixels located adjacent to a boundary intermediate the one and the other of the subsets, and wherein the processing of the image data of the respective one of the subsets comprises processing using the image data of pixels of the other of the subsets residing within the overlapping region.

25. The device of claim 24 wherein the processing of the image data of the pixels within the overlapping region during the processing of the one subset comprises processing using a common threshold modulation scheme comprising comparing the image data of the pixels of the overlapping region with the same thresholds during the processing of the one and the other subsets.

26. The device of claim 24 wherein the processors are individually configured to process the image data of the respective subset comprising comparing the image data of the pixels of the respective subset with a plurality of respective thresholds and to modulate the thresholds of the pixels of the overlapping region using a common modulation pattern.

27. The device of claim 26 wherein the modulation of the thresholds provides identical thresholds for the pixels of the overlapping region for comparing during processing of the one and the other subsets.

28. The device of claim 26 wherein the processors are configured to attenuate the modulation to a lesser degree for pixels located adjacent to a boundary intermediate the subsets compared with pixels spaced increased distances with respect to the boundary.

29. The device of claim 24 wherein the processors are configured to modulate the thresholds of pixels of the overlapping region according to a first modulation scheme, and to modulate thresholds of pixels of the one and the other subsets not within the overlapping region according to a second modulation scheme different than the first modulation scheme.

30. The device of claim 23 wherein the processors are individually configured to discard processed image data of the other of the subsets after obtaining processed image data for the respective one of the subsets.

31. The device of claim 23 wherein the processors are individually configured to process the image data of an individual one of the subsets without knowledge of processing of the image data of others of the subsets using any others of the processors.

32. A hard imaging device comprising:
interface means for accessing image data of an image and comprising a plurality of pixels;
processing means coupled with the interface means, and the processing means comprising independent processing means for independently processing a plurality of respective subsets of the image data using an overlapping region comprising image data of respective adjacent ones of the subsets, wherein the processing comprises comparing the image data of the pixels with respective ones of a plurality of different thresholds for the respective pixels;
wherein the processing of an individual one of the subsets using a respective one of the independent processing means comprises processing pixels of both of the subsets of the overlapping region using the same threshold modulation of the thresholds as the processing of the same pixels using an other of the independent processing means; and
imaging means coupled with the processing means, and the imaging means comprising means for generating a hard image upon media using the image data.

33. The device of claim 32 wherein the processing means comprise a plurality of respective processing circuits configured to process respective ones of the subsets in parallel.

34. The device of claim 32 wherein the independent processing means individually comprise means for processing the image data of an individual one of the subsets without knowledge of processing of the image data of others of the subsets using any others of the independent processing means.

35. An article of manufacture comprising:
processor-usable media comprising programming configured to cause one of a plurality of independent processing circuits to:
access image data for a plurality of pixels of one subset of the image data, wherein the image data comprises data of an image;
access image data for a plurality of pixels of an other subset of the image data; and
process the image data of the pixels of the one subset of the image data, wherein the processing comprises implementing halftone error diffusion processing of the image data of the pixels of the one subset using the image data of the pixels of the other subset of the image data.

36. The article of claim 35 wherein the programming is further configured to cause the one of the independent processing circuits to generate an overlapping region adjacent a boundary intermediate the one and the other subsets, and wherein the processing of the image data of the pixels of the one of the subsets using the image data of the pixels of the other of the subsets comprises using the image data of the pixels of the other of the subsets residing within the overlapping region.

37. The article of claim 36 wherein the programming is further configured to cause the one of the independent processing circuits to compare the image data of the pixels with a plurality of respective thresholds and to modulate the thresholds for the pixels of the overlapping region using a common modulation pattern used by an other of the independent processing circuits.

38. The article of claim 37 wherein the programming is further configured to cause the one of the independent processing circuits to attenuate the threshold modulation to a lesser degree for pixels located adjacent to the boundary compared with pixels spaced increased distances with respect to the boundary.

39. The article of claim 35 wherein the programming is configured to cause the one of the independent processing circuits to process the image data of the pixels of the one subset of the image data without knowledge of processing of the image data of pixels of other subsets of the image data using any others of the independent processing circuits.

* * * * *